(12) United States Patent
Yagoobi

(10) Patent No.: US 10,132,527 B2
(45) Date of Patent: Nov. 20, 2018

(54) ELECTROHYDRODYNAMIC (EHD) REFRIGERANT PUMP

(71) Applicant: WORCESTER POLYTECHNIC INSTITUTE, Worcester, MA (US)

(72) Inventor: Jamal S. Yagoobi, Hopkinton, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 15/279,852

(22) Filed: Sep. 29, 2016

(65) Prior Publication Data

US 2017/0089611 A1 Mar. 30, 2017

Related U.S. Application Data

(60) Provisional application No. 62/234,092, filed on Sep. 29, 2015.

(51) Int. Cl.
*F25B 1/10* (2006.01)
*F25B 31/00* (2006.01)
(Continued)

(52) U.S. Cl.
CPC .............. *F25B 1/10* (2013.01); *F04B 19/006* (2013.01); *F25B 1/00* (2013.01); *F25B 31/00* (2013.01); *H02K 44/02* (2013.01); *H02N 11/006* (2013.01)

(58) Field of Classification Search
CPC ... F25B 1/10; F25B 1/00; F25B 31/00; H02K 44/02; F04B 19/006; H02N 11/006
See application file for complete search history.

(56) References Cited

U.S. PATENT DOCUMENTS

| 3,398,685 A | 8/1968 | Stuetzer |
| 6,392,580 B1 | 5/2002 | Swanson |

(Continued)

FOREIGN PATENT DOCUMENTS

| RU | 2037261 C1 | 6/1995 |
| WO | WO 2004/001944 A1 | 12/2003 |

OTHER PUBLICATIONS

International Search Report and the Written Opinion of the International Searching Authority for PCT/US2016/054339, dated Dec. 29, 2016, pp. 7.

*Primary Examiner* — Emmanuel Duke
(74) *Attorney, Agent, or Firm* — Armis Intellectual Property Law, LLC

(57) ABSTRACT

An electrohydrodynamic (EHD) pump increases refrigerant flow rate and the resulting pressure in a vapor compression based cooling system for permitting reduced compressor sizes and power demands. The EHD pump disposes electrodes in a liquid path of the refrigerant flow, and increases fluid flow and resulting pressure by an induced liquid flow between a pair of asymmetric electrodes. Voltage applied to these electrodes results in a conduction pumping mechanism associated with heterocharge layers in the vicinity of the electrodes based on disassociation of a neutral electrolyte species in the refrigerant fluid and recombination of the generated ions. The induced flow draws the liquid due to a net fluid flow toward one of the electrodes based on the asymmetry of the electrode pair. Electrodes are disposed on an inner surface of a refrigerant vessel, in communication with an annular liquid film that forms around the inner circumference in two-phase fluid systems.

18 Claims, 5 Drawing Sheets

(51) Int. Cl.
  *H02N 11/00* (2006.01)
  *F04B 19/00* (2006.01)
  *F25B 1/00* (2006.01)
  *H02K 44/02* (2006.01)

(56) References Cited

U.S. PATENT DOCUMENTS

| | | |
|---|---|---|
| 6,409,975 B1 | 6/2002 | Seyed-Yagoobi et al. |
| 6,932,580 B2 | 8/2005 | Yagoobi et al. |
| 7,004,238 B2 | 2/2006 | Seyed-Yagoobi et al. |
| 7,261,521 B2 | 8/2007 | Yagoobi |
| 8,568,106 B2 | 10/2013 | Yagoobi et al. |
| 2007/0056315 A1* | 3/2007 | Huang .................. F25B 39/04 62/506 |
| 2011/0268585 A1* | 11/2011 | Yagoobi ................ F04B 19/006 417/48 |
| 2014/0090403 A1 | 4/2014 | Pearson et al. |

* cited by examiner

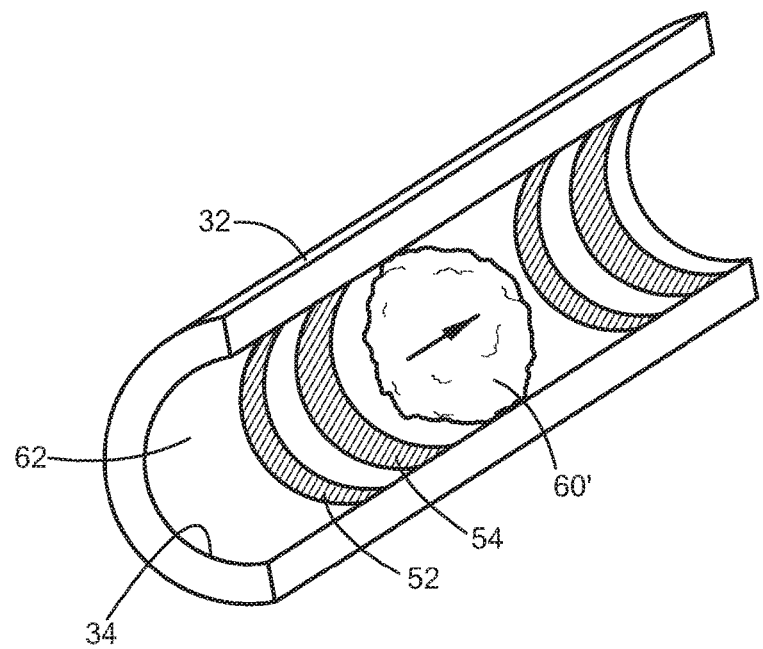
FIG. 3b
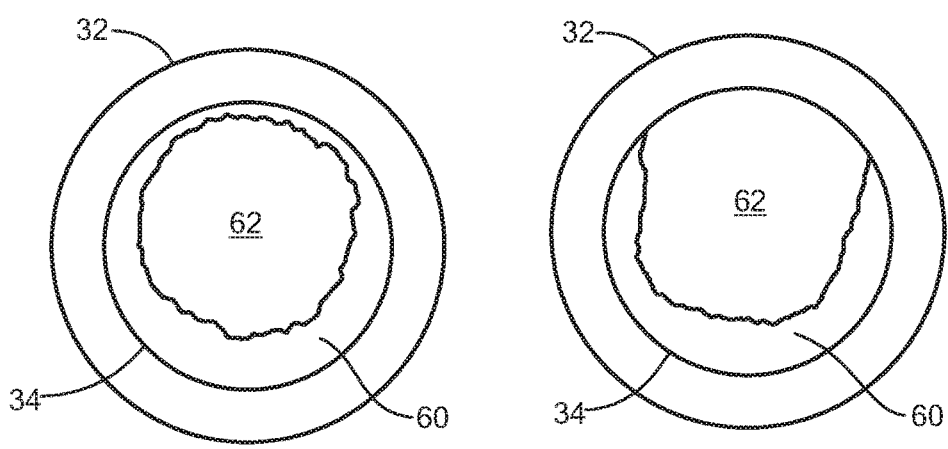
FIG. 3c  FIG. 3d

US 10,132,527 B2

ELECTROHYDRODYNAMIC (EHD) REFRIGERANT PUMP

RELATED APPLICATIONS

This application claims the benefit under 35 U.S.C. § 119(e) of U.S. Provisional Patent Application No. 62/234,092, filed Sep. 29, 2015, entitled "ELECTROHYDRODYNAMIC (EHD) REFRIGERANT PUMP," incorporated herein by reference in entirety.

STATEMENT REGARDING FEDERALLY SPONSORED RESEARCH AND DEVELOPMENT

The subject matter disclosed herein was developed from funding under contract No. NNX12AR32G with NASA (National Aeronautics and Space Administration). The Government has certain rights in the Invention.

BACKGROUND

Vapor compression systems are employed for refrigeration and cooling for ambient air ("air conditioning") systems and for refrigeration/freezing for perishable food items. Such vapor compression systems generally rely on a two-phase refrigerant that alternates gaseous and liquid states in a cyclic manner to transfer heat from a cooled or conditioned region and exhaust the heat to the ambient outside surroundings. A compressor alters the pressure of the refrigerant gas. Temperature differences in the refrigerant flow and the cooled region cause thermal transfer for causing the refrigerant to absorb heat from the cooled region and exhaust heat to the ambient surroundings as it changes phase in response to thermal transfer. An electric motor typically drives the compressor and requires substantial power to perform the cyclic refrigerant compression.

SUMMARY

An electrohydrodynamic (EHD) pump increases refrigerant flow rate and the resulting pressure in a vapor compression based cooling system for permitting reduced compressor sizes and power demands. The EHD pump disposes electrodes in a liquid path of the refrigerant flow, and increases fluid flow and resulting pressure by an induced liquid flow between a pair of asymmetric electrodes in the fluid path. Voltage applied to these electrodes results in a conduction pumping mechanism associated with heterocharge layers in the vicinity of the electrodes based on disassociation of a neutral electrolyte species in the refrigerant fluid and recombination of the generated ions. The induced flow draws the liquid due to a net fluid flow toward one of the electrodes based on the asymmetry of the electrode pair. Electrodes are disposed on an inner surface of a refrigerant vessel, in communication with an annular liquid film that forms around the inner circumference in two-phase fluid systems. A plurality of successive asymmetric electrode pairs in a refrigerant vessel of the cooling system thus increases pressure and permitting smaller sizing of the compressor for a given cooling demand.

Configurations herein are based, in part, on the observation that the compressor pumps represent substantial power requirements of a vapor compression based cooling system. Unfortunately, conventional approaches to efficiency in vapor compression cooling systems focus on compressor improvements, and do not leverage the observation that compressing a fluid in a gas phase is very energy intensive compared to pumping a liquid. While modest power is needed for air movement fans across heat exchange units, a greater increase in efficiency may be obtained by reducing the compressor size. Further, conventional approaches cannot pump a liquid film when it occurs in a combined fluidic flow with a gaseous counterpart. Accordingly, configurations herein substantially overcome the above-described shortcomings of conventional vapor compressors by providing an EHD pump in a refrigerant vessel in the evaporator or compressor of the cooling system for increasing fluid flow and pressure. The EHD requires significantly less energy than the pumping/compressive capability that it replaces, allowing a smaller compressor in conjunction with EHD pumps for an overall energy efficiency improvement.

In further detail, configurations herein employ an electrohydrodynamic pumping device in a thermal exchange component such as an evaporator or compressor in a vapor compression cooling apparatus. The thermal exchange component includes a plurality of vessels or tubes adapted to transport a refrigerant, such that the refrigerant has a gaseous component and a liquid component, and an asymmetric electrode pair attached to an interior surface of the vessel, in which each electrode of the electrode pair has an opposed polarity. Typically multiple asymmetric electrode pairs are installed along the length of the tube. A voltage source applies a charge to the electrode pair, such that the voltage source is operable to induce a refrigerant flow in the vessel based on disassociation of electrolytes in the liquid component causing a fluid flow and increased pressure between the electrodes of the electrode pair, thus augmenting the pressure applied from the compressor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIGS. 3a-3b are a perspective cutaway view of the vessel in the cooling device of FIG. 2;

FIGS. 3c-3d show fluid occupancy in the vessel of FIGS. 3a-3b; and

FIG. 4 is a side view of the vessel in FIG. 3a.

DETAILED DESCRIPTION

Depicted below is an example of a vapor compression cooling system suitable for use with configurations herein. The system components include the compressor, evaporator and condenser including refrigerant vessels, expansion device and associated refrigeration tubing suitable for transporting the pressurized refrigerant. The refrigerant travels in a circuitous path with EHD pumps disposed in the vessels through the thermal exchange components: evaporator and condenser. The disclosed configuration depicts an example usage of the claimed EHD pumps; alternative refrigerant based transport, or placement outside the condenser and evaporator may be performed in alternate configurations.

EHD phenomena involve the interaction of electric fields and flow fields in a dielectric fluid medium. The EHD conduction pumping mechanism is associated with heterocharge layers of finite thickness in the vicinity of the electrodes, which are based on the process of dissociation of the neutral electrolytic species and recombination of the generated ions. The conduction term represents a mechanism for electric current flow in which charged carriers are produced not by injection from electrodes, but by dissociation of electrolytes within the fluid. The attraction between electrodes and charges within the corresponding heterocharge layer induces the fluid motion in the vicinity of the electrodes, from the liquid side to the electrode side. With an asymmetric electrode-pair design, a net flow can be achieved in the desired direction. EHD pumps are non-mechanical and light weight. They generate no vibration and require negligible electric power to operate (a few Watts for all pumps in the proposed technology). Such pumps are capable of pumping dielectric liquids as well as dielectric liquid films.

EHD conduction pumps will generate significant favorable pressure gains in kPa across each tube, reducing the resultant frictional pressure losses. Note that despite the fact that input electric power of the EHD conduction pumps is very small; it is directly spent on pumping of the liquid film in the condenser and evaporator. A typical mechanical pump to produce a similar liquid flow rate within a two phase device will require a much higher pumping power. Furthermore, a conventional mechanical pump or compressor cannot simply pump the liquid film or liquid/gas combination. Such a conduction approach as outlined below is not achievable with a mechanical pump.

Figure 1:
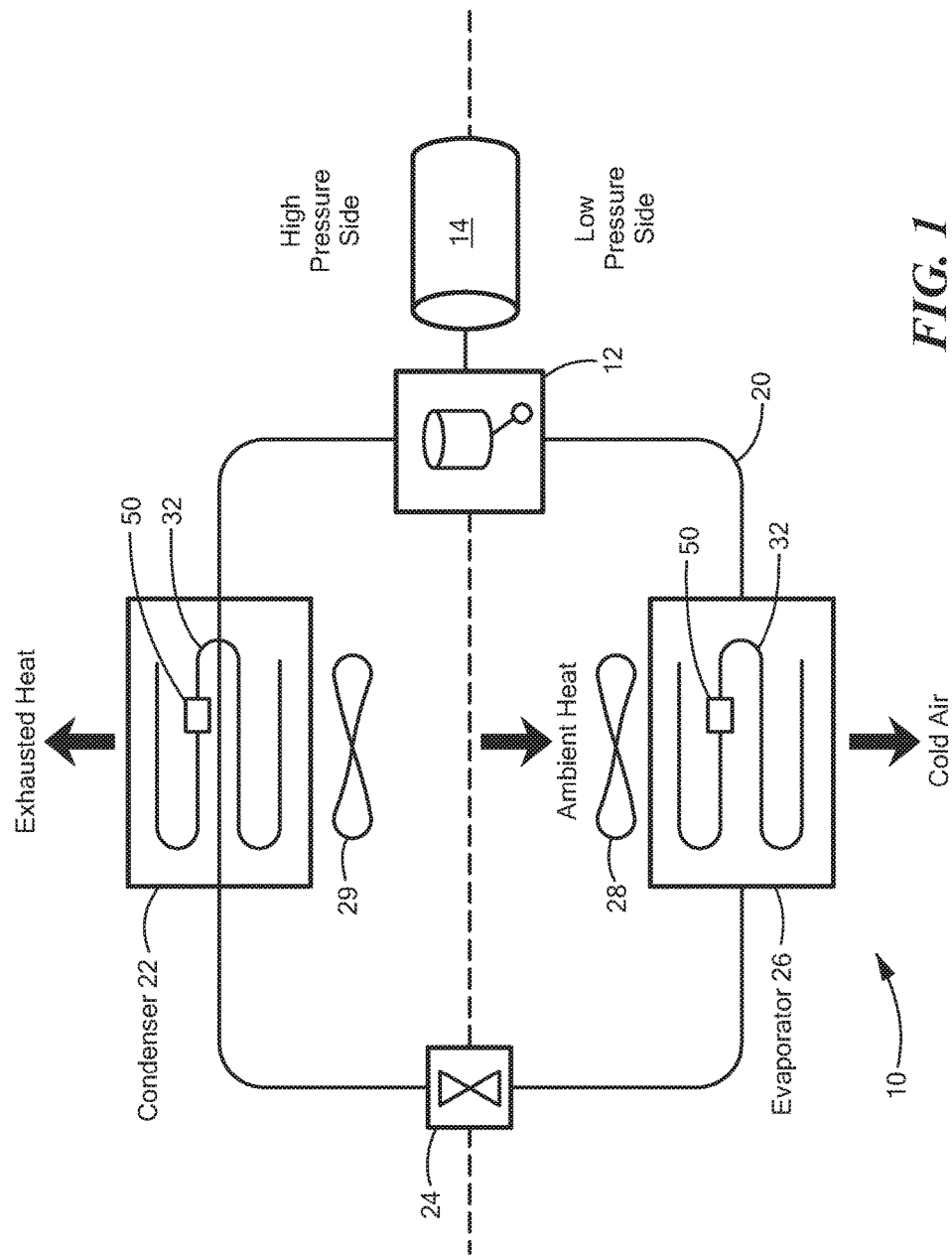
FIG. 1 is a context diagram of a cooling environment suitable for use with configurations disclosed herein.

FIG. 1 is a context diagram of a cooling environment suitable for use with configurations disclosed herein. Referring to FIG. 1, in a cooling environment 10 a compressor 12 is driven by a motor 14 for circulating refrigerant around a cooling circuit 20. The cooling circuit 20 is an interconnection of pipes and/or tubing for connecting the components of the cooling system, including the condenser 22, metering device 24, and evaporator 26.

In operation, the refrigerant circulates in the cooling circuit 20 and changes phase between a liquid and gas. A cooled low pressure liquid enters the evaporator 26, where it evaporates or "boils" to convert to a gaseous phase while absorbing heat from the ambient cooled area, typically driven by a fan 28. The resulting gas travels to the compressor 12 to generate a high pressure gas entering the condenser 22. The condenser 22 receives the hot, high pressure gas from the compressor 12, and vents the heat to the atmosphere, also typically fan 29 assisted. As the high pressure gas cools, it condenses back into a liquid and travels to the metering device 24, such as an expansion valve or orifice tube, which demarcates the high and low pressure sides of the system and moderates the amount of low pressure, cooled liquid entering the evaporator 26.

The evaporator 26 and condenser 22 each employ an arrangement of tubes or vessels 32 for thermal exchange. In the vessels 32, the refrigerant is generally transitioning between phases, either evaporating from a liquid to a gas in the evaporator 26, or condensing from a gas to a liquid (condenser 22). Therefore, the vessels 32 contain a two-phase fluid of a varying ratio along the length of the vessel 32, as the refrigerant changes phase while travelling through the vessel 32. In configurations disclosed herein, an electrohydrodynamic (EHD) pump 50 operates in-line with the refrigerant flow, typically on a refrigerant vessel 32 in the evaporator 26 or condenser 22. The compressor 12 and EHD pumps 50, discussed further below, force the refrigerant through the vessels 32 and around the cooling circuit 20.

Figure 2:
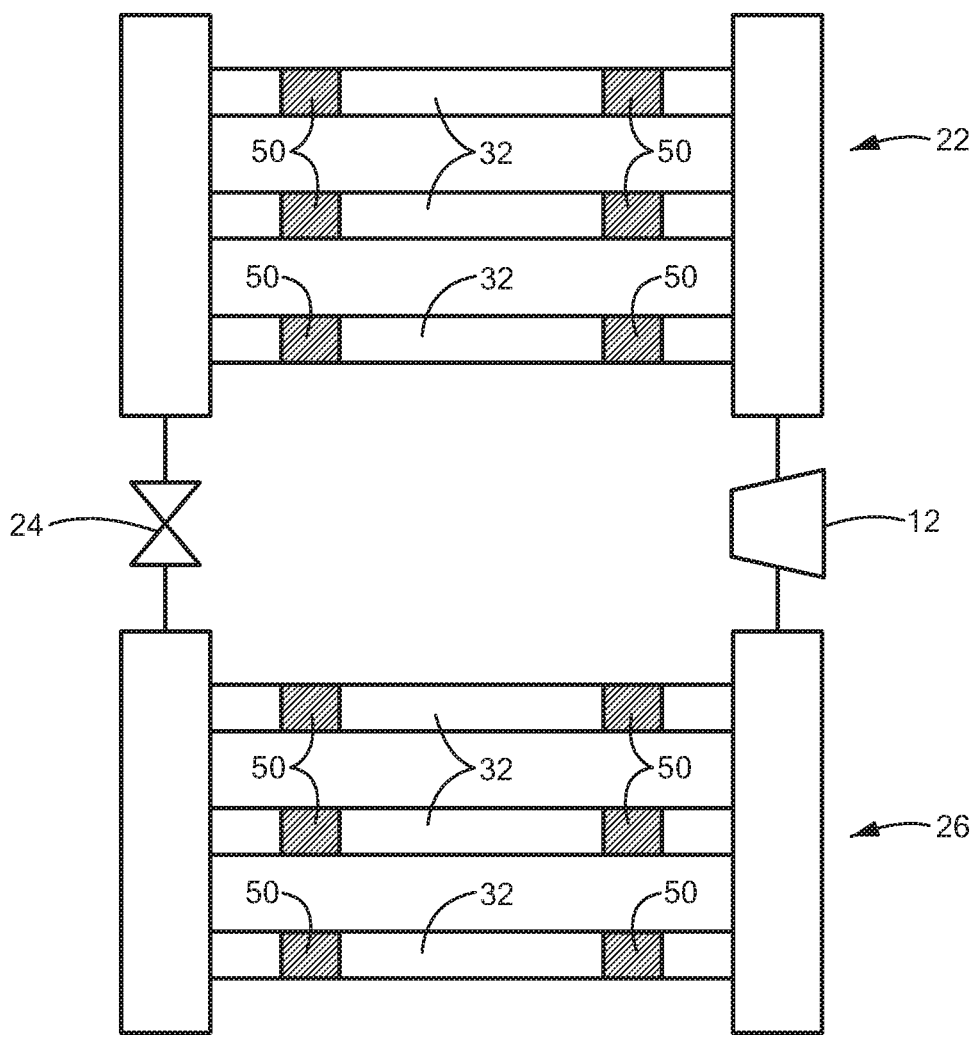
FIG. 2 is a block diagram of EHD pumps in the cooling device of FIG. 1.

FIG. 2 is a block diagram of EHD pumps in the cooling device of FIG. 1. Referring to FIGS. 1 and 2, the vessels 32 may take any suitable form, such as parallel, coiled, S-shaped, or other arrangement which facilitates thermal exchange with the ambient air. In an example configuration, the vessels 32 include plurality of parallel vessels, such that each vessel 32 contributes to a net fluid flow between the evaporator 26 and condenser 22 in the compressor driven two-phase refrigeration circuit 20. Each vessel 32 of the parallel vessels has an upstream end and a downstream end, based on an intended direction of refrigerant flow, and the parallel vessels are connected in fluidic communication at the upstream and downstream ends in a manifold or union arrangement.

A network of metal plates, or fins, is also often attached to the outside of the vessels 32 to facilitate thermal transfer. Other thermally conductive materials may also be employed. The vessels 32 themselves may be constructed of any suitable material sufficient to contain a pressure of the cooling circuit 20 and that permits electrical communication with the EHD pumps 50. Attachment of electrical leads to the vessel 32 for powering the EHD pumps would generally be through an outer surface of the vessel 32 to an interior surface, or otherwise integrated in the vessel construction.

The EHD pumps 50 are disposed on an interior surface of the vessels 32, in communication with a liquid component or liquid film of the refrigerant. Since the liquid component includes a liquid film, typically forming along a lower interior wall of the vessel, a volume of the vessel above the liquid film is occupied by the gaseous component of the refrigerant. As the refrigerant is a two phase fluid having a gaseous component and a liquid component, the gaseous component and the liquid component may have a varied ratio as the refrigerant travels through the vessel, based on thermal exchange with an ambient environment. A plurality of EHD pumps 20 may be disposed in sequence, at varying intervals, and typically concentrated at a region of greater liquid concentration.

Figure 3A:
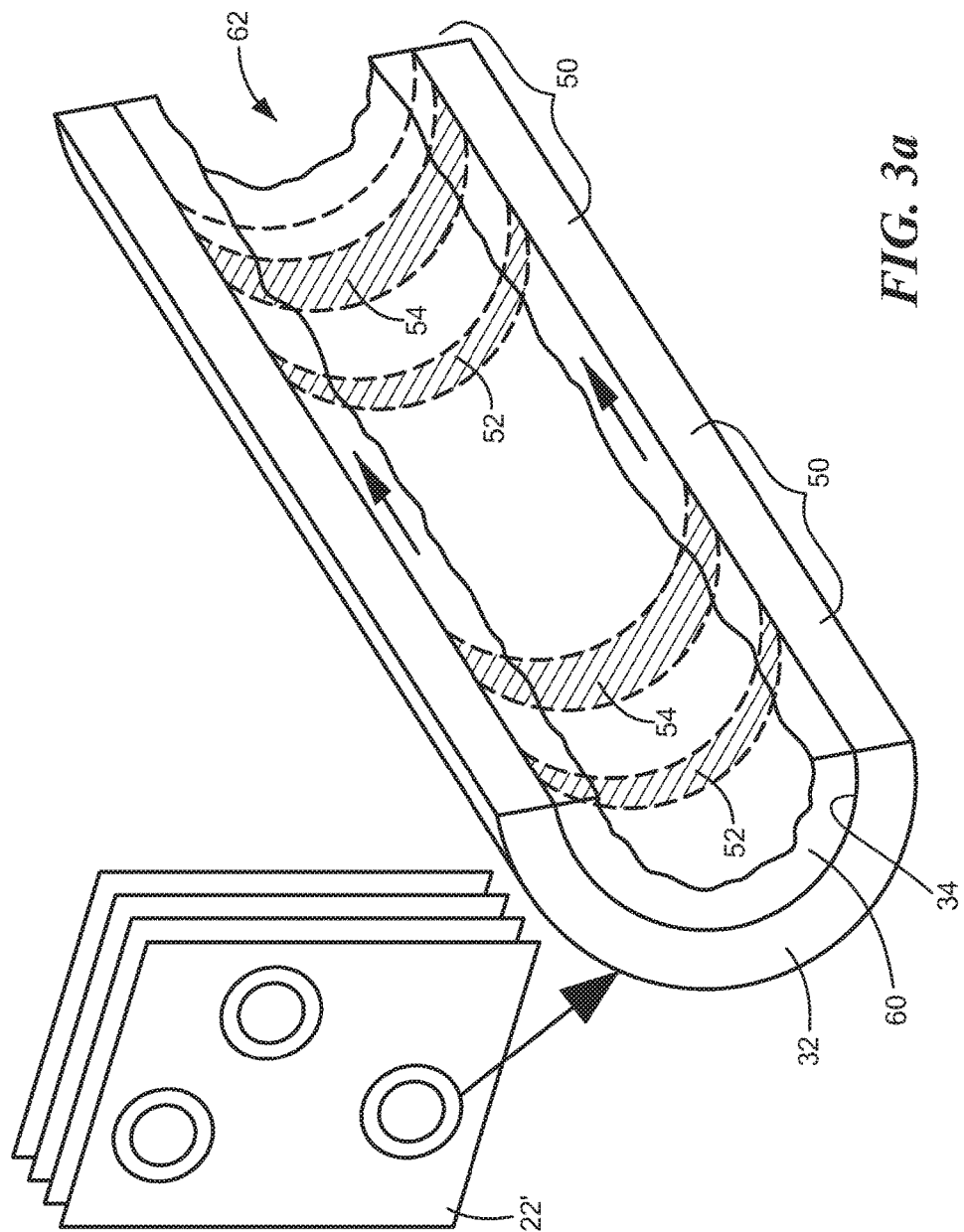

FIG. 3a is a perspective, cutaway view of the vessel 32 in the cooling device of FIG. 2, and FIG. 3b is a perspective cutaway view of a smaller diameter vessel 32. Referring to FIGS. 1-3a, the vessel 32 is typically disposed in a heat exchanger (which may be either a condenser or evaporator) including a network of vessels and thermally conductive plates or fins. The EHD pumps 50 take the form of a pair of asymmetric electrodes on the interior surface of the vessel 32. The asymmetric electrode pair includes a larger electrode and a smaller electrode, in which the larger electrode is disposed in a downstream direction of the fluid flow from the smaller electrode. In the example configuration of FIGS. 3a and 3b, these take the form of a narrow electrode 52 and a wide electrode 54, both forming concentric rings or bands with an interior surface 34 of the vessel 32. The asymmetric electrodes 52, 54 are responsive to a voltage source and the refrigerant for causing a disassociation of electrolytes in the refrigerant for producing a net charge flow in the presence of the asymmetric electrodes 52, 54, discussed further below.

The refrigerant is a two phase composition including a liquid component 60 or liquid film forming an annular layer in the interior surface 34 around the inner circumference, and a gaseous component 62 around the center. Depending on the pressure in the vessel 32, the liquid film may rise to varying heights on the interior surface 34, with the heavier liquid tending to settle on the bottom of the vessel in a lower pressure, and rise up in a concave manner when the gaseous component 62 is at a higher pressure. Accordingly, the electrodes 52, 54 may occupy the entire circumference, or may be disposed only on a lower portion of the vessel as a plate or point electrode.

Refrigerant flow in a typical circular vessel 32 tends to form a liquid film around the inner circumference. This two-phase flow is characterized by a vapor above a liquid flow in the circular volume defined by the interior. While a static liquid and gaseous combination would form a flat, level surface due to gravity, in a pressurized fluid flow the liquid tends to rise along the sides and form a concave shape around the center, based on the pressure and viscosity of the fluid in the vessel.

In vessels 32 with a smaller diameter (FIG. 3b), the liquid may form slugs 60' of liquid volume, occupying an entire volume of a length of the vessel 32, separated by pockets of the gaseous component 62. Pumping action of the asymmetric electrodes 52, 54 generally occurs from liquid contact with the electrodes, and transport of the gaseous component 62 facilitated by friction with the liquid component 60. The size of the vessel 32 varies at different points in the cooling circuit 20, based on temperature and pressure, resulting in the variation in the liquid film and slug 60' formation.

FIGS. 3c-3d show fluid occupancy in the vessel 32. Referring to FIGS. 3a-d, depending on the pressure of the gaseous component 62, the liquid 60 forms a film or layer around the interior surface 34 of the vessel 32. In FIG. 3c, the liquid layer is thinner at the top of the vessel 32 as the liquid 60 tends to settle to the bottom. In FIG. 3d, the liquid 60 is more settled and partially rises on the interior surface 34 forming a concave valley around the interior surface 34.

Figure 4:
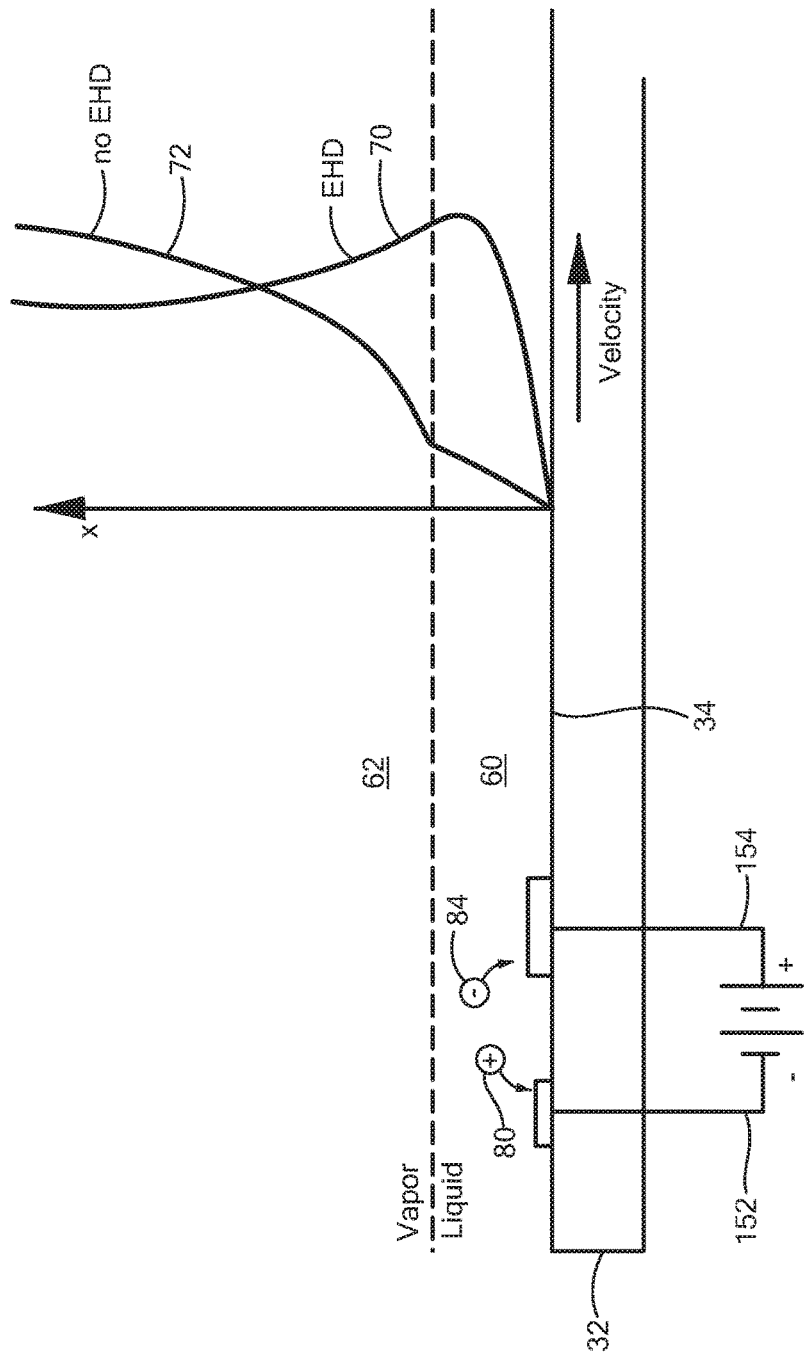

FIG. 4 is a side view of the vessel in FIG. 3. Referring to FIG. 4, the narrow electrode 52 and wide electrode 54 connect to respective leads 152, 154 connected to opposed poles of a voltage source 58. The liquid component 60 of the refrigerant includes charged molecules, or heterocharge layer. In the example of FIGS. 3 and 4, a heterocharge layer in the fluid flow induced by the asymmetric electrodes includes dissimilarly charged molecules having a greater tendency to flow toward the larger electrode of the asymmetric pair 52, 54 for inducing a net flow in the direction of a larger area of the larger electrode 54.

Due to the heterocharge layer, the charged molecules 82, 84 in the liquid 60 or liquid film are attracted to the dissimilar polarity electrode 52, 54. Since the wide electrode is larger, a net flow results from more molecules 82, 84 being drawn in that direction. As the vapor (gaseous component 62) tends to slow the liquid flow, shown by line 72, the EHD induced flow (line 70) increases liquid 60 velocity, particularly at a region adjacent the electrodes and below or removed from the gaseous component 62.

The refrigerant used is a dielectric fluid. Such a dielectric fluid is responsive, in a liquid phase, to the asymmetric electrodes, for disassociation of electrolytes within the liquid for inducing a net flow toward one of the electrodes of the asymmetric electrode pair. In other words, since the downstream electrode is larger, more molecules are attracted in that direction than to the smaller electrode, resulting in a net downstream flow.

The electrode placement and number may take any suitable form for achieving the desired EHD pumping response. A sequence of EHD pumps 50, each having an electrode pair 52, 54, may be disposed along a length of the vessel 32. Further, the vessel 32 in a heat exchange apparatus may be a single, repeatedly inverted (i.e. "S" shaped) length of tubing, or may be multiple parallel lengths as shown in FIG. 2. Placement of a plurality of electrodes is based on a varying ratio of refrigerant in a liquid state and gaseous state, and may be such that the placement has a shorter spacing and greater density of electrode pairs where a liquid component of the fluid flow is prevalent over the gaseous component. As the refrigerant flows through the vessel 32, it is changing phase from a gas to liquid or vice-versa, depending on whether it is in the condenser or the evaporator. Accordingly, at the upstream end, the refrigerant has a greater or lesser quantity of a liquid component to the gas component, and the reverse is true at the opposed end, as the condenser receives gas and outputs liquid, the evaporator does the reverse. Therefore, the electrode pairs may disposed at a varying interval along the vessel, such that the interval between electrode pairs increasing or decreasing in the direction of the fluid flow.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An electrohydrodynamic pumping device, comprising:
   a vessel adapted to transport a refrigerant, the refrigerant having a gaseous component and a liquid component;
   an asymmetric electrode pair attached to an interior surface of the vessel, each electrode of the electrode pair having an opposed polarity, the asymmetric electrode pair having a cylindrical shape around an interior wall of the vessel and including a larger electrode and a smaller electrode, the larger electrode occupying a greater linear distance than the smaller electrode, the larger electrode disposed in a downstream direction of the fluid flow from the smaller electrode; and
   a voltage source for applying a charge to the electrode pair; the voltage source operable to induce a refrigerant flow in the vessel based on disassociation of electrolytes in the liquid component causing a fluid flow and increased pressure between the electrodes of the electrode pair.

2. The device of claim 1 further comprising a heterocharge layer in the fluid flow induced by the asymmetric electrodes, the heterocharge layer including dissimilarly charged molecules having a greater tendency to flow toward the larger electrode of the asymmetric pair for inducing a net flow in the direction of a larger area of the larger electrode.

3. The device of claim 2 wherein device includes a plurality of parallel vessels, each vessel contributing to the net fluid flow between an evaporator and condenser in a compressor driven two-phase refrigeration apparatus, each vessel of the parallel vessels having an upstream end and a downstream end, the parallel vessels in fluidic communication at the upstream and downstream ends.

4. The device of claim 1 wherein the refrigerant is a dielectric fluid, the dielectric fluid responsive, in a liquid phase, to the asymmetric electrodes, for disassociation of electrolytes within the liquid for inducing a net flow toward one of the electrodes of the asymmetric electrode pair.

5. The device of claim 1 wherein the asymmetric electrodes are responsive to the voltage source and the refrigerant for causing a disassociation of electrolytes in the refrigerant for producing a net charge flow in the presence of the asymmetric electrodes.

6. The device of claim 1 wherein the refrigerant is a two phase fluid having a gaseous component and a liquid component, the gaseous component and the liquid component having a varied ratio as the refrigerant travels through the vessel, the ratio based on thermal exchange with an ambient environment.

7. The device of claim 6 wherein the liquid component includes a liquid film, the liquid film forming along a lower interior wall of the vessel, such that a volume of the vessel above the liquid film is occupied by the gaseous component of the refrigerant.

8. The device of claim 7 wherein a placement of a plurality of electrodes is based on a varying ratio of refrigerant in a liquid state and gaseous state, the placement having a shorter spacing and greater density of electrode pairs where a liquid component of the fluid flow is prevalent over the gaseous component.

9. The device of claim 1 wherein the electrode pairs are disposed at a varying interval along the vessel, the interval between electrode pairs increasing in the direction of the fluid flow.

10. The device of claim 1 wherein the electrode pairs are disposed at a varying interval along the vessel, the interval between electrode pairs decreasing in the direction of the fluid flow.

11. The device of claim 1 wherein the electrode is an asymmetric electrode pair including a larger electrode and a smaller electrode, the larger electrode disposed in a downstream direction of the fluid flow from the smaller electrode.

12. The device of claim 1 wherein the cylindrical shape of the interior wall defines a settled volume of refrigerant at a bottom of the vessel.

13. The device of claim 1 wherein the cylindrical electrodes have a diameter defined by the annular interior of the vessel and share a concentric axis.

14. A method for transporting refrigerant in a refrigeration system, comprising:
   disposing at least one cylindrical electrode in a fluid vessel in the refrigeration system;
   attaching a ground around the perimeter of the fluid vessel proximate to the disposed electrode;
   selecting a dielectric refrigerant for circulation in the refrigeration system;
   mechanically circulating the refrigerant via pressure from a refrigerant compressor; and
   applying a voltage to the disposed electrode for inducing a pressure in the circulated fluid, the induced pressure increasing a Coefficient of Performance (COP) of the refrigeration system by mitigating a pumping load on the refrigerant compressor in the refrigeration system.

15. The method of claim 14 further comprising disposing the electrode in a sidewall of the fluid vessel in a non impeding location to a fluidic flow.

16. The method of claim 14 further comprising disposing the electrode in conjunction with a liquid phase of the refrigerant.

17. The method of claim 14 wherein the electrode and ground define an electric conduction pumping station associated with heterocharge layers of finite thickness in the vicinity of the electrode, the induced pressure based on dissociation of a neutral electrolytic species and recombination of generated ions.

18. The method of claim 14 wherein the selected refrigerant includes a dielectric fluid or a liquid film.

* * * * *